Figure 2:
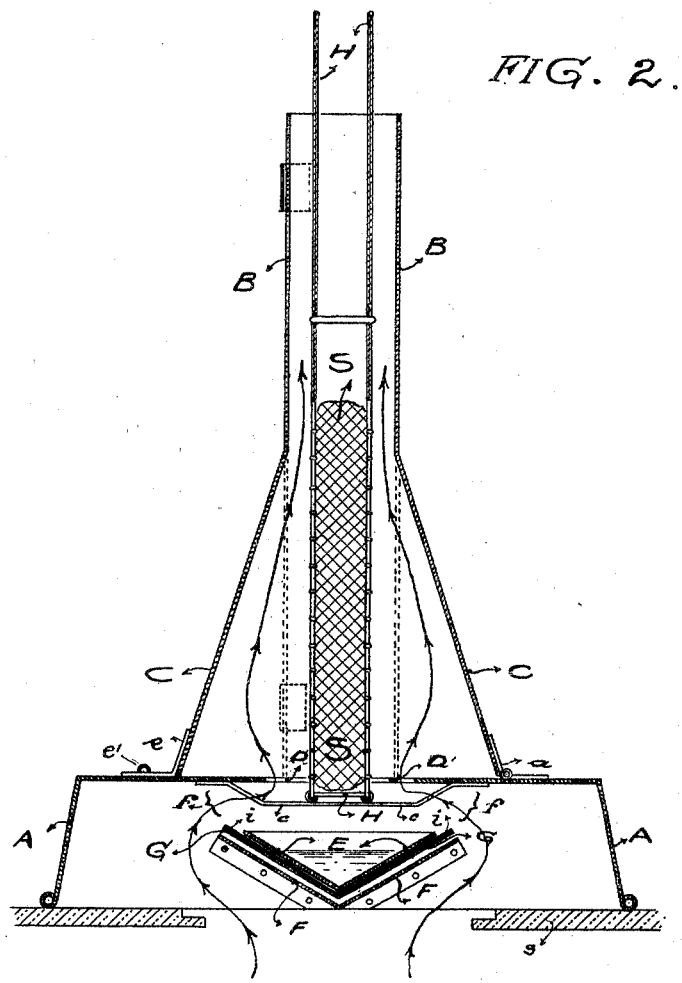

No. 760,430. PATENTED MAY 24, 1904.
C. B. DANIEL.
BROILER.
APPLICATION FILED OCT. 6, 1903.
NO MODEL. 3 SHEETS—SHEET 1.
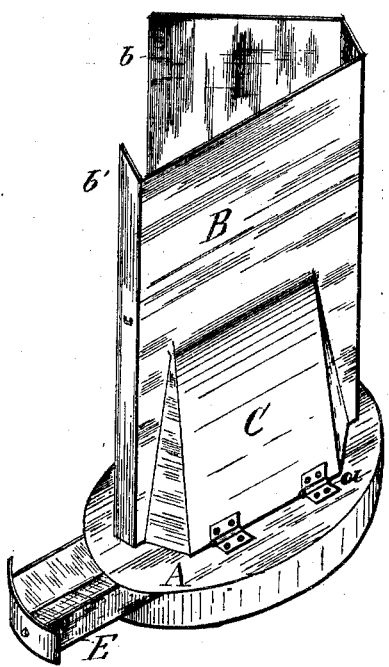
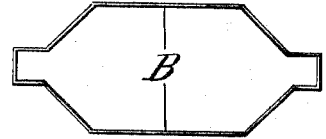
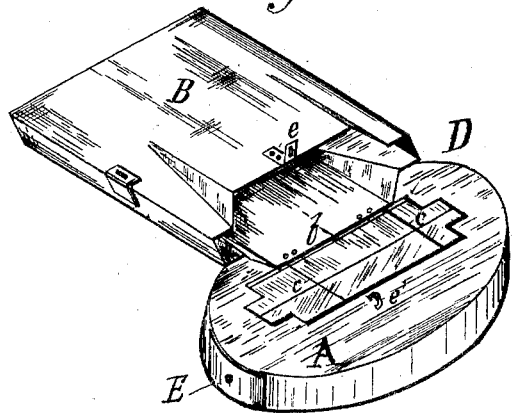
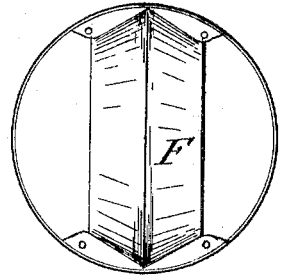
WITNESSES
Elizabeth J. McConville.
Erwin M. Eichler.
INVENTOR.
Chileon B. Daniel
BY
John F. Kerr
ATTORNEY.

No. 760,430. PATENTED MAY 24, 1904.
C. B. DANIEL.
BROILER.
APPLICATION FILED OCT. 6, 1903.
NO MODEL. 3 SHEETS—SHEET 2.

No. 760,430. PATENTED MAY 24, 1904.
C. B. DANIEL.
BROILER.
APPLICATION FILED OCT. 6, 1903.
NO MODEL. 3 SHEETS—SHEET 3.
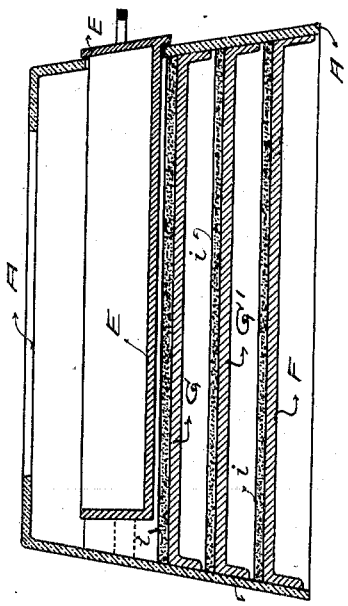
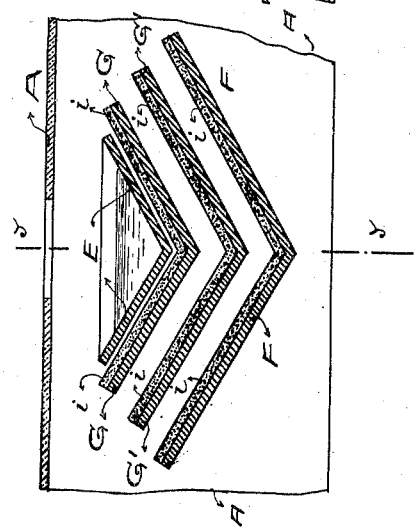
Witnesses
Inventor
Chileon B. Daniel.
By his Attorney
John F. Kerr No. 760,430. Patented May 24, 1904.

UNITED STATES PATENT OFFICE.

CHILEON B. DANIEL, OF PATERSON, NEW JERSEY.

BROILER.

SPECIFICATION forming part of Letters Patent No. 760,430, dated May 24, 1904.

Application filed October 6, 1903. Serial No. 175,914. (No model.)

*To all whom it may concern:*

Be it known that I, CHILEON B. DANIEL, a citizen of the United States of America, residing at Paterson, in the county of Passaic and State of New Jersey, have invented certain new and useful Improvements in Broilers, of which the following is a specification, reference being had therein to the accompanying drawings.

The objects of my invention are to produce a device for broiling meat and fish and for other culinary purposes which from its simplicity of construction and ease of operation will facilitate the broiling or cooking of edibles, which will lessen the liability of broiling one portion more than another, and will obviate the objectionable results of such an unequal cooking, and to produce a device that will be inexpensive and durable.

The invention consists of the novel construction, arrangement, and combination of the parts of the device illustrated in the drawings, and which will be hereinafter described, and pointed out in my claims.

In the drawings, Figure 1 is an elevation showing a side and an end view of my broiler and the arrangement of its various parts. Fig. 2 is a vertical sectional view showing the construction of the same and the method of inserting the steak or other object to be broiled between the vertical walls of the broiler; Fig. 3, a top plan view of broiler, the vertical wall portion being turned back on its hinges; Fig. 4, a bottom plan view of the vertical wall portion; Fig. 5, a bottom plan view of the base of the broiler, showing the flame-deflector. Fig. 6 is an enlarged cross-sectional view of lower portion of broiler with additional layers of asbestos and metal $i$ and G' between deflector and drawer, and Fig. 7 a longitudinal sectional view on line $y$ $y$ in Fig. 6.

In the drawings, A represents the base upon which stands the vertical walls B, which on two sides, the front and the rear sides, is provided with an offset C, slanting from the upper portion to the lower portion, which rests upon the base. The vertical walls B, with their offsets C, may be secured to the base A by hinges $a$ or other suitable securing means.

The top of the base A is provided with an opening D, over which the vertical walls B are secured. Suitable supports $c$ are arranged below and across said opening D to form a rest for the steak-holder or other device which holds the material to be broiled. The vertical walls are prevented from tipping by means of any suitable device, such as is indicated in Fig. 3 by $e$ and $e'$. Said walls B are hinged to the base A, and I prefer to make them so that they can open, as indicated by $b$ and $b'$ in Fig. 1, where the side wall is shown released from engagement with the end wall.

The offset or widened portion C of the vertical walls B may be constructed of one or more pieces without departing from the scope or spirit of my invention.

Secured to the base A below the opening D is an asbestos-covered support G, upon which the V-shaped drawer E is adapted to rest. The drawer E is removable. When it is inserted, it receives the drippings from the broiling meat.

The deflector F, composed of asbestos or some similar substance and metal, is secured to the base A and is spaced some distance away from and below said drawer and its support G. The deflector F serves to direct the heat-currents which pass upwardly and outwardly over its inclined sides and through the spaces or openings $f$ $f$ between the upper edges of the deflector and the lower surface of the top A and through the opening D to the interior of the chamber formed by the vertical walls B. In space between the deflector F and the V-shaped drawer E and its support G additional layers of metal G' and asbestos $i$ or other suitable material may be inserted, if desired, without departing from the scope of my invention.

H represents a device for holding the steak S or other material while being broiled in the chamber formed by the walls B. The removable drawer E is adapted to rest upon and slide in and out of the support G, and the drawer itself is located below the upper edges of the said support. The shelf or slide G is covered with asbestos $i$ or a like substance to protect the sliding drawer and contents thereof.

Any suitable heating means may be utilized for broiling purposes, such as gas and gasolene burners or other heat-producers. The currents of heat are directed by the deflector F, as is indicated by the arrows in Fig. 2 of the drawings.

The metal parts G and G' and the asbestos coverings $i$ prevent the burning of the drippings which fall into the drawer E, and thus obviate any objectionable odor or smoke. The lower portion of the chamber formed by the vertical walls B being larger than the upper portion of the chamber formed by the vertical walls B, owing to the offsets C, the currents of heat are permitted to spread where they would be most intense, thus equalizing the heat in its ascent and subjecting the steak being broiled to a substantially uniform heat. In Fig. 2, $s$ represents a stove or other heat-producer upon which my device may be placed.

The deflector F may obviously consist of asbestos and one piece of metal or of a plurality of pieces.

With this description of my invention, what I claim is—

1. A broiler comprising an inverted dish-shaped base having an opening in the top, supports extending across said opening, a vertical chamber, increasing in size from a point substantially midway its length to the bottom, thereof, to receive the object to be broiled, and adapted to be secured to the base over the opening therein, a sliding drawer located in said base below said opening, a support for said drawer, a deflector composed of asbestos and metal spaced away from and below the drawer and its support, and layers of metal and asbestos or other suitable material located in said space substantially as set forth.

2. In a broiler the V-shaped drawer, a support for said drawer, a deflector that may be composed of asbestos and one piece of metal or a plurality of pieces of metal, said deflector being spaced from said drawer, and additional layers of metal and asbestos situated between said deflector and said drawer.

3. In a broiler, the base having a central opening, a sliding drawer, an asbestos-covered support for said drawer, below said opening, and deflecting means below said support, consisting of metal and asbestos or other similar substance, substantially as set forth.

4. In a broiler, the base having a central opening, a sliding drawer, an asbestos-covered support for said drawer, below said opening, and deflecting means below said support, consisting of metal and asbestos or other similar substance, a vertical chamber increasing in size from a point substantially midway its length, to the bottom thereof, secured to said base, substantially as set forth.

In testimony whereof I affix my signature in presence of two witnesses.

CHILEON B. DANIEL.

Witnesses:
ELIZABETH I. McCONVILLE,
JOHN F. KERR.